(12) United States Patent
Bailen

(10) Patent No.: US 9,092,075 B2
(45) Date of Patent: Jul. 28, 2015

(54) FINGERTIP MOUSE AND BASE

(71) Applicant: Michael P. Bailen, Mason, WI (US)

(72) Inventor: Michael P. Bailen, Mason, WI (US)

(73) Assignee: FTM Computer Products, Duluth, MN (US)

( * ) Notice: Subject to any disclaimer, the term of this patent is extended or adjusted under 35 U.S.C. 154(b) by 0 days.

(21) Appl. No.: 14/592,475

(22) Filed: Jan. 8, 2015

(65) Prior Publication Data
US 2015/0123905 A1    May 7, 2015

Related U.S. Application Data

(63) Continuation of application No. 14/174,483, filed on Feb. 6, 2014, which is a continuation of application No. 11/754,071, filed on May 25, 2007, now Pat. No. 8,648,805, which is a continuation-in-part of application No. 11/266,498, filed on Nov. 3, 2005, now abandoned.

(60) Provisional application No. 60/625,254, filed on Nov. 5, 2004.

(51) Int. Cl.
  *G06F 3/0354* (2013.01)
  *G06F 3/03* (2006.01)
  *G06F 3/038* (2013.01)
  *G06F 3/039* (2013.01)

(52) U.S. Cl.
  CPC ............ *G06F 3/03543* (2013.01); *G06F 3/038* (2013.01); *G06F 3/039* (2013.01); *G06F 3/0317* (2013.01); *G06F 2203/0331* (2013.01); *G06F 2203/0335* (2013.01); *G06F 2203/0337* (2013.01); *G06F 2203/0383* (2013.01)

(58) Field of Classification Search
  CPC ................ G06F 2203/0331; G06F 2203/0335; G06F 2203/0337; G06F 2203/0383; G06F 3/0317; G06F 3/03543; G06F 3/038; G06F 3/039
  USPC ................................... 345/156–157, 163, 173
  See application file for complete search history.

(56) References Cited

U.S. PATENT DOCUMENTS 4,780,707 A    10/1988  Selker
4,954,817 A *   9/1990  Levine ........................... 345/179

(Continued)

FOREIGN PATENT DOCUMENTS

CA    2 372 268    8/2003
ES    1 058 782    2/2005

(Continued)

OTHER PUBLICATIONS

"Wearable fingertip mouse" [online] IP.com, [retrieved on May 2, 2005]. Retrieved from the Internet: <URL: www.priorartdatabase.com/IPCOM/000031024>, 2 pages.

(Continued)

*Primary Examiner* — Quan-Zhen Wang
*Assistant Examiner* — Tony Davis
(74) *Attorney, Agent, or Firm* — Fish & Richardson P.C.

(57) ABSTRACT

The subject matter of this specification can be embodied in, among other things, a system that includes a tracking device to generate movement information for use in moving a user interface object on a graphical user interface. The tracking device is configured to receive at least a portion of a user's finger. The system also includes a base device configured to receive the tracking device. The base device is configured to translate movement of the base device relative to an adjacent surface for use in moving the user interface object.

10 Claims, 13 Drawing Sheets

(56) References Cited

U.S. PATENT DOCUMENTS

| | | | |
|---|---|---|---|
| 5,220,690 A | 6/1993 | Hoos | |
| 5,355,148 A | 10/1994 | Anderson | |
| 5,444,462 A | 8/1995 | Wambach | |
| 5,453,759 A | 9/1995 | Seebach | |
| 5,489,922 A | 2/1996 | Zloof | |
| 5,563,628 A | 10/1996 | Stroop | |
| 5,581,484 A | 12/1996 | Prince | |
| 5,627,348 A | 5/1997 | Berkson et al. | |
| 5,657,012 A | 8/1997 | Tait | |
| 5,706,026 A * | 1/1998 | Kent et al. | 345/156 |
| 5,764,164 A | 6/1998 | Cartabiano et al. | |
| 5,796,354 A | 8/1998 | Cartabiano et al. | |
| 5,886,685 A | 3/1999 | Best | |
| 5,894,303 A | 4/1999 | Barr | |
| 5,940,066 A | 8/1999 | Weinblatt | |
| 5,990,870 A | 11/1999 | Chen et al. | |
| 5,999,166 A * | 12/1999 | Rangan | 345/157 |
| 6,034,627 A | 3/2000 | Wei | |
| 6,043,807 A | 3/2000 | Carroll | |
| 6,097,369 A | 8/2000 | Wambach | |
| 6,098,886 A | 8/2000 | Swift et al. | |
| 6,154,199 A | 11/2000 | Butler | |
| 6,297,808 B1 | 10/2001 | Yang | |
| 6,462,732 B2 | 10/2002 | Mehr | |
| 6,580,420 B1 | 6/2003 | Wang | |
| 6,587,090 B1 | 7/2003 | Jarra | |
| 6,590,563 B1 | 7/2003 | Oross et al. | |
| 7,057,604 B2 | 6/2006 | Bajramovic | |
| 8,648,805 B2 | 2/2014 | Bailen | |
| 2002/0056009 A1* | 5/2002 | Affif et al. | 709/246 |
| 2002/0067342 A1 | 6/2002 | Proper | |
| 2002/0101401 A1 | 8/2002 | Movahed | |
| 2002/0186198 A1* | 12/2002 | Coghan | 345/156 |
| 2003/0025670 A1* | 2/2003 | Barnett et al. | 345/157 |
| 2003/0038783 A1 | 2/2003 | Baughman | |
| 2003/0071787 A1 | 4/2003 | Gerstacker | |
| 2003/0174124 A1 | 9/2003 | How | |
| 2003/0214481 A1 | 11/2003 | Xiong | |
| 2003/0214482 A1 | 11/2003 | Chen | |
| 2003/0227437 A1 | 12/2003 | Ramirez | |
| 2004/0080493 A1 | 4/2004 | Kenin | |
| 2004/0097265 A1* | 5/2004 | Cadieux et al. | 455/557 |
| 2004/0130531 A1 | 7/2004 | Cheng | |
| 2004/0256456 A1 | 12/2004 | Coughlin et al. | |
| 2005/0052412 A1 | 3/2005 | McRae et al. | |
| 2005/0231470 A1 | 10/2005 | Sugino et al. | |
| 2006/0012567 A1 | 1/2006 | Sicklinger | |
| 2006/0022636 A1* | 2/2006 | Xian et al. | 320/108 |
| 2006/0033710 A1* | 2/2006 | Bajramovic | 345/156 |
| 2006/0079276 A1* | 4/2006 | Indik et al. | 455/556.1 |

FOREIGN PATENT DOCUMENTS

| | | |
|---|---|---|
| JP | A H427-0408 | 9/1992 |
| JP | H10-301706 | 11/1998 |
| JP | 2000-330722 | 11/2000 |
| JP | A 2001-202194 | 7/2001 |
| JP | 2003-29924 | 1/2003 |
| JP | 2003-186615 | 7/2003 |
| JP | 3117814 | 12/2005 |
| JP | 2006-164275 | 6/2006 |
| WO | WO 02/31757 | 4/2002 |
| WO | WO 03/049020 | 6/2003 |
| WO | WO 2004/049244 | 6/2004 |
| WO | WO 2006/039852 | 4/2006 |
| WO | WO 2006/048477 | 5/2006 |

OTHER PUBLICATIONS

International Search Report and Written Opinion for PCT Application No. PCT/US2008/064764, dated Apr. 15, 2009, 15 pages.
European Patent Office, Office Action issued in EP Application No. 08-756-239.3, dated Aug. 2, 2011, 5 pages.
Japanese Office Action in JP Application No. 2010-510443, dated Dec. 27, 2012, 6 pages (w/ English translation).

* cited by examiner

FINGERTIP MOUSE AND BASE

RELATED APPLICATIONS

This application is a continuation of U.S. patent application Ser. No. 14/174,483, filed Feb. 6, 2014, which is a continuation of U.S. patent application Ser. No. 11/754,071, filed May 2, 2007 (now U.S. Pat. No. 8,648,805), which application claims priority from and is a continuation-in-part of U.S. patent application Ser. No. 11/266,498, filed Nov. 3, 2005 (Abandoned), and titled "Fingertip Mouse," which claims priority from Provisional Application No. 60/625,254, filed Nov. 5, 2004. The entirety of each are hereby incorporated by reference.

TECHNICAL FIELD

This instant specification relates to computer peripherals, and, more particularly, to peripherals used to track movement.

BACKGROUND

Some current computer mice are constructed in a size that approximates the size of a human had. A mouse can be moved across a pad using the palm of a hand and may have one or more buttons to use in making selections that affect an attached computer. Some mice have a trackball that engages the pad to move a cursor on a computer.

SUMMARY

In general, this document describes a computer peripheral for tracking movement.

In a first general aspect, a computer peripheral system is described. The system includes a tracking device to generate movement information for use in moving a user interface object on a graphical user interface. The tracking device is configured to receive at least a portion of a user's finger. The system also includes a base device configured to receive the tracking device. The base device is configured to translate movement of the base device relative to an adjacent surface for use in moving the user interface object.

In a second general aspect, an apparatus is described. The apparatus includes a base device to receive a tracking device configured for placement on a user's finger. The tracking device generates movement information for use in moving a user interface object on a user interface. The base device is configured to translate movement of the base device relative to an adjacent surface for use in moving the user interface object.

In a third general aspect, an apparatus is described that includes a housing having a finger holding portion configured to receive a portion of a finger of a user and a movement tracker to generate movement information based on movement of the housing relative to an adjacent surface. The movement information is configured to move a first user interface object on a display. The apparatus also includes a pressure sensitive switch coupled to the housing and configured to make a selection of a second user interface object on the display when the switch is pressed against the adjacent surface.

The systems and techniques described here may provide one or more of the following advantages. A tracking device can be provided that is small, portable, and initiative to use to control a cursor on a user interface. A base that receives the tracking device can be used to simulate conventional computer mice. The base can provide a convenient charging mechanism for the tracking device when the tracking device is inserted in the base. Cost of production can be decreased by configuring the base to use the tracking device's tracking sensors instead of including independent sensors in the base.

The details of one or more embodiments of the fingertip mouse and base feature are set forth in the accompanying drawings and the description below. Other features and advantages of the fingertip mouse and base feature will be apparent from the description and drawings, and from the claims.

DETAILED DESCRIPTION

Implementations are described of a system for controlling a cursor displayed on a user interface. In certain implementations, the system can include a tracking device that translates movement information for use by a computer system in controlling the cursor. Optionally, the tracking device can be housed and work in conjunction with a base device, which is described below. In certain implementations, the tracking device is configured to be worn on a computer user's finger (where the term finger includes a thumb), and may communicate wirelessly with the computer system. The base can be configured to have the shape and functionality of a conventional computer input peripheral, such as a computer mouse. The tracking device can be inserted in the base. In certain implementations, the base uses the tracking device hardware to track movements for transmission to the computer system. For example, the integrated base and tracking device may be used in lieu of using the tracking device alone if a user prefers a conventional input device to the tracking device that is configured to be placed on the user's finger.

Figure 1:
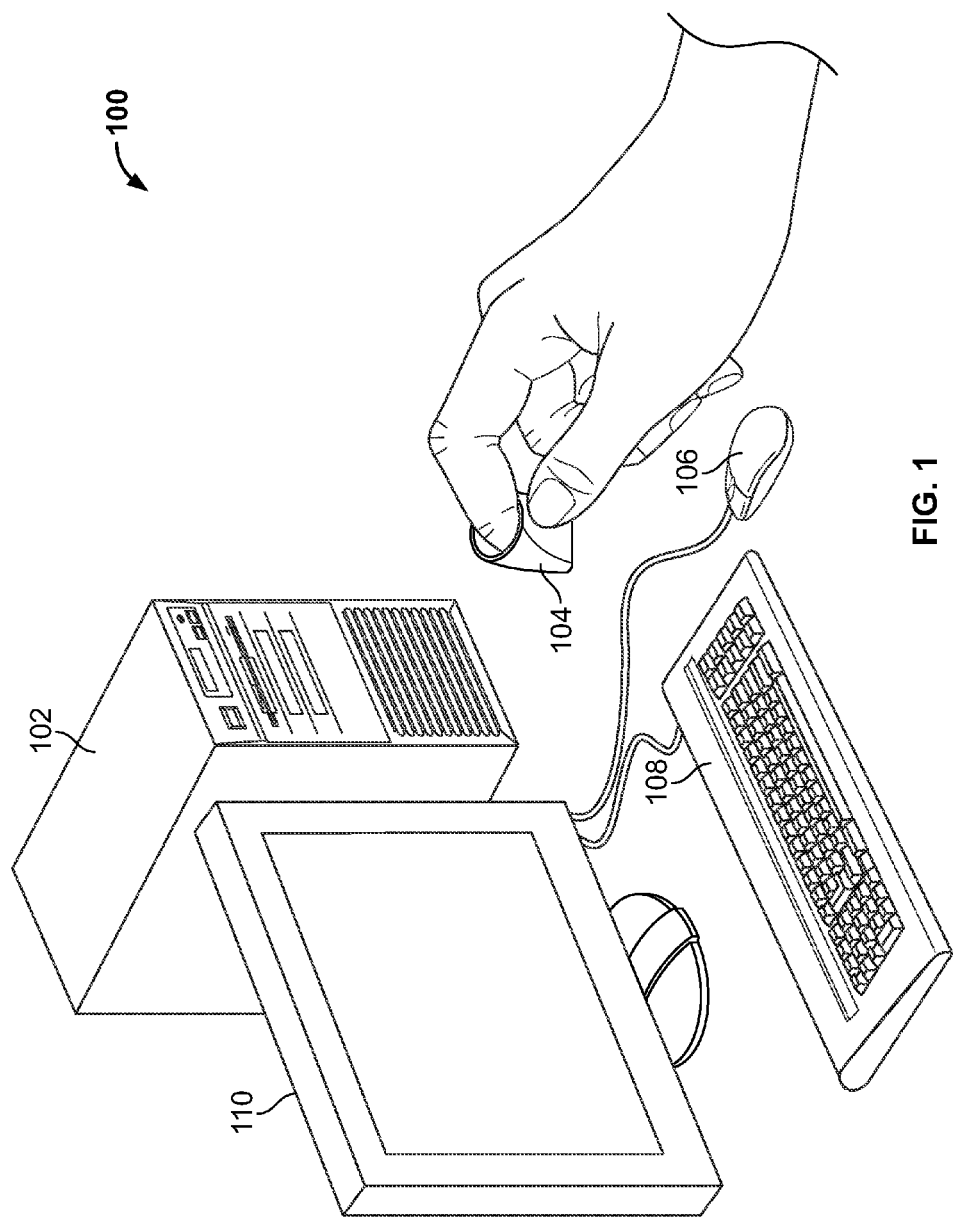
FIG. 1. is a schematic diagram depicting an exemplary system for controlling a cursor displayed on a user interface of a computer system.

FIG. 1. is a schematic diagram depicting an exemplary system 100 for controlling a cursor displayed on a user interface of a computer system 102. The system 100 includes a tracking device 104 that detects and transmits movement information, and a base 106, which may among other things, receive the tracking device 104. Additionally, the system 100 can include components or peripherals such as a keyboard 108 for entering information, a monitor 110 to display information such as the cursor, or various other types of peripherals.

In certain implementations, the tracking device 104 can communicate wirelessly with the computer system 102. For example, the tracking device 104 can fit on a user's finger 112 and can communicate with the computer system 102 using a wireless protocol, such as Bluetooth. Using this method of communication may permit a user to freely position the tracking device 104.

In certain implementations, the base 106 can communicate with the computer system 102 independent of the tracking device 104. For example, the base 106 can contain its own tracking mechanism to allow the base 106 to function as a conventional computer mouse without the tracking device 104. Alternatively, in other implementations, the base 106 can communicate with the computer system 102 in conjunction with the tracking device 104. For example, in certain implementations, if the tracking device 104 is inserted into the base 106, the base 106 may disable its own tracking mechanism and make use of the tracking mechanism included with the tracking device 104.

In certain other implementations, the base 106 may not include its own tracking mechanism, but uses the tracking device's tracking mechanism when the tracking device is inserted in the base.

Figure 2:
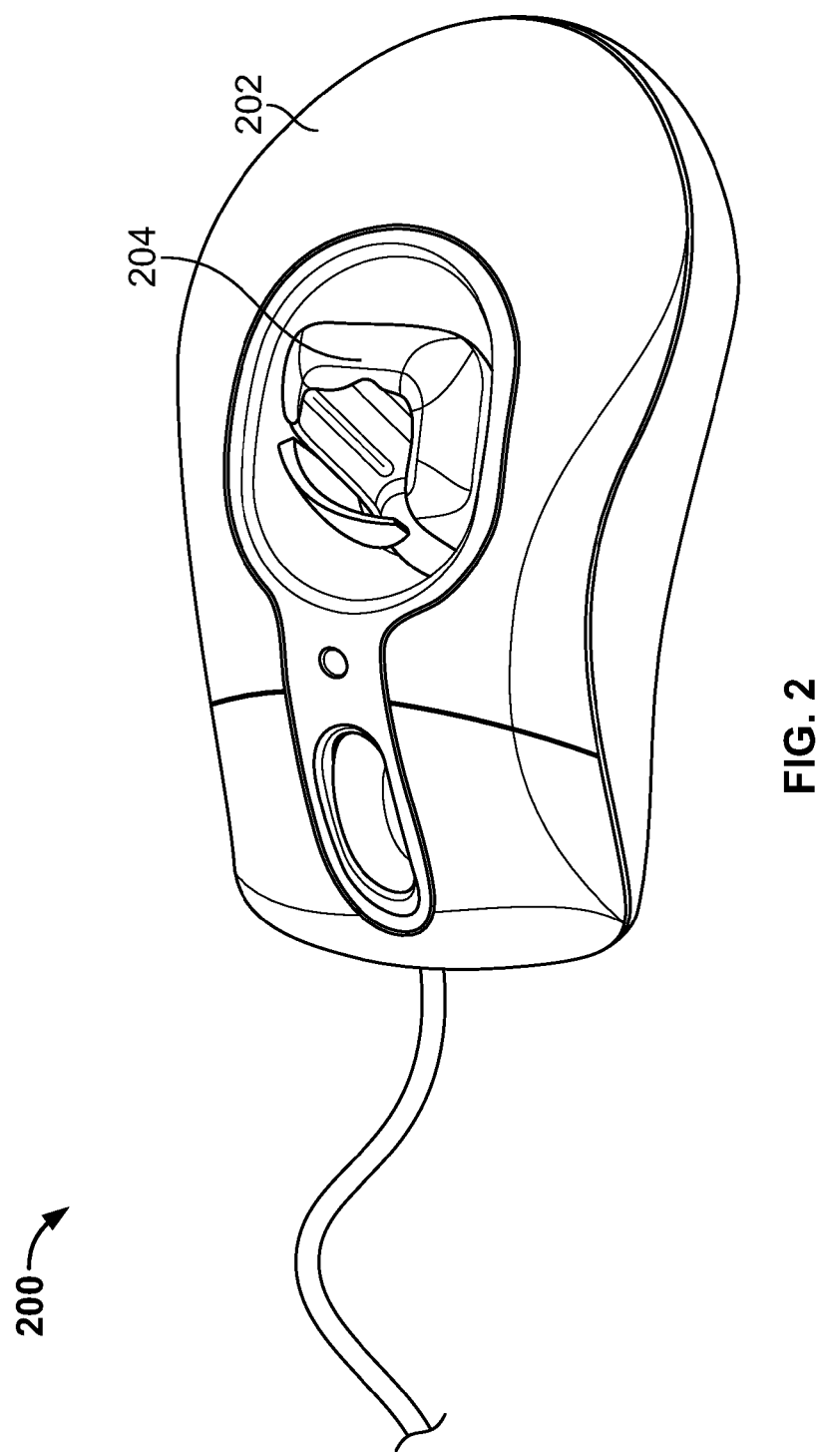
FIG. 2 is a schematic diagram depicting an exemplary system including a base device.

In certain implementations, the base 106 can dock with the tracking device 104, as shown in FIG. 2. In one implementation, if the tracking device 104 is inserted into the base 106, the components can function together as a single tracking device 104, for example, as a computer mouse. By operating as a single component, the tracking device 104 and the base 106 may provide a data input experience substantially similar to that of a conventional computer mouse, which may be more familiar to certain users. Additionally, in certain implementations, by docking together with the base 106, the tracking device 104 can, for example, recharge its power supply or share tracking system components.

FIG. 2 is a schematic diagram depicting an exemplary system 200 including a base device 202. In certain implementations, the base 202 can be connected to a computer via a wired connection, such as through a USB (Universal Serial Bus), RS-232, or PS-2 connection. As depicted in FIG. 2, the base 202 can receive the tracking device 204. In certain implementations, while the tracking device 204 is connected to the base 202, power can be delivered through the USB connection to charge rechargeable batteries within the tracking device 204.

In some implementations, the tracking device 204 can include a tracking mechanism, which can be used by the base 202. For example, the tracking device 204 may include an optic sensor that monitors movement and transmits movement to the base 202. In an alternate embodiment, the base 202 can have its own tracking mechanism. In some implementations, if the tracking device 204 is inserted into the base 202, the tracking mechanism for the base 202 can be disabled, allowing the base 202 to use the tracking mechanism of the tracking device 204.

Figure 3:
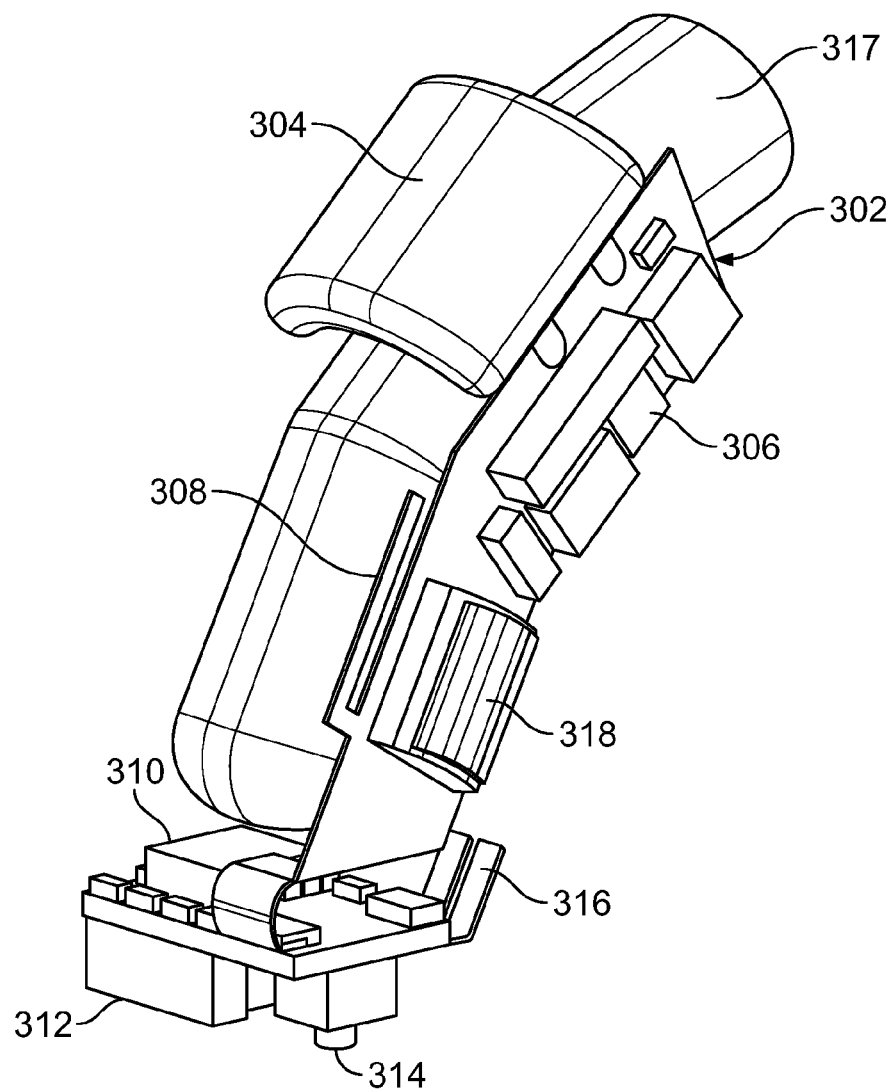
FIG. 3 is a schematic diagram depicting one implementation of a tracking device.

FIG. 3 is a schematic diagram depicting one implementation of a tracking device 302. The tracking device 302 may include one or more components, such as a battery 304, power supply components 306, an antenna 308, an optical sensor 310, a lens 312, a select switch 314, charging contacts 316, and a scroll wheel 318. The tracking device 302 can be configured for placement on a user's finger 317. In certain implementations, the tracking device 302 may include a housing into which a user inserts his or her finger 317. The housing may include one or more retention mechanisms to hold the user's finger 317 in place. Example retention mechanisms are described in more detail in association with FIG. 4.

In certain implementations, a select switch 314 can be added to the tip of the tracking device 302. The select switch 314, in some implementations, permits a user to select items on a user interface. For example, a user can position a cursor over a hyperlink displayed in a web browser and select the hyperlink by activating the select switch 314. The select switch 314 can be activated if the user applies pressure to a tip of the tracking device 302 in a downward movement against an adjacent surface. In certain other implementations, the select switch 314 can be located inside the tracking device 302 near the optical sensor 310, and can be in direct contact with the user's finger 317. In certain other implementations, the select switch 314 can be located on the outside of the tracking device 302. For example, the select switch 314 can be integrated with the scroll wheel 318.

In other implementations, the select switch 314 can include a rocker switch, where scrolling can be accomplished by pressing the switch forward and backward or upwards and downwards.

In yet other implementations, the select switch can be implemented using an accelerometer. For example, when a user taps a surface once, the accelerometer can sense the movement and register a selection analogous to a single-click by a conventional mouse button. The accelerometer can also detect multiple movements within a defined period. The multiple movements, such as a user tapping a surface twice in rapid succession, may indicate a particular type of selection, such as a double-click selection.

In certain implementations, the tracking device 302 can include a power source, such as the battery 304, which can be recharged by the base 202. For example, the tracking device 302 may recharge the battery 304 when the charging contacts 316 make contact with the base 202 as the tracking device 302 is inserted into the base 202. Additionally, power supply components 306 can regulate the battery 304 recharging process. In some implementations, the battery 304 is placed in a portion of the tracking device that is positioned below a user's inserted finger. This positioning may improve ergonomics of the tracking device because locating the battery under the finger balances the weight of the battery without having the battery's weight resting on top of the user's finger.

As mentioned previously, in certain implementations, the tracking device 302 may include the antenna 308 for communicating with the computer system 102. For example, in certain implementations, the antenna 308 may be configured for placement inside the exterior body of the tracking device 302. In certain other implementations, the antenna 308 may be configured for placement outside the body of the tracking device 302. The antenna 308 may transmit data to a receiver of the computer system 102. For example, the antenna 308 may transmit movement data, battery status data, input data, output data, scroll selection data, or other types of data to a receive of the computer system 102. In certain implementations, the antenna 308 can transmit the data wirelessly using Radio Frequency (RF) protocol to a RF receiver connected to a USB port of the computer system 102. In yet other implementations, the tracking device 302 can transmit data to the base, which transmits the data to the computer system 102 using a wireless or wired connection.

In certain implementations, the tracking device 302 can include a lens 312 for optically tracking the movement of the tracking device 302. The lens 312 may, for example, direct infrared light towards an adjacent surface in a similar fashion to the lens included in a traditional computer mouse. In some implementations, the lens 312 may be constructed from glass or plastic materials. The lens 312 may also, for example, protect an optical sensor 310 from debris or unwanted contact.

In certain implementations, the tracking device 302 can include the optical sensor 310 which uses movement captured by the lens to generate movement information. The optical sensor 310 can, for example, also transmit the movement information for use by the computer system. The computer system 102 can use the transmitted information to drive a cursor. For example, the optical sensor 310 may use infrared technology to track movement by monitoring changes in the reflection of light off of an adjacent surface.

In some implementations, the tracking mechanism, such as the optical sensor 310, is sized so that a user can easily manipulate objects on a user interface. For example, movement of the sensor across one inch of an adjacent surface can correspond to movement across the entire displayed user interface. The tracking mechanism in the tracking device can be sufficiently small so that it can be easily and precisely moved one inch.

In other implementations, the sensor 310 can include a trackball, rollerball, scroll wheel, laser based sensor, or accelerometer to track movement. The movement translation components may be used separately or in combination with these, or other exemplary components.

In other example implementations, the tracking device 302 may include buttons not shown in FIG. 3, which may provide additional methods for selection, input, or other types of functions. For example, in one implementation, buttons can be located on the outside of the tracking device 302 near the user's thumb. In certain implementations, a first button may provide selection functions. Additionally, in certain implementations, a second button may prompt the display of user interface menus. For example, selecting the second button while viewing an image on a web page can prompt a web browser to display a menu that includes options, such as "save image as . . . ," "set as desktop background . . . ," "properties," etc.

The tracking device 302 can be constructed using various materials such as lightweight plastic, fiberglass, or other types of materials, and the device 302 may be implemented using various form factors. For example, the tracking device can enclose the user's finger 317, or have open areas in the front, sides, or back, which may allow the escape of moisture and provide comfort to the user.

Figure 4:
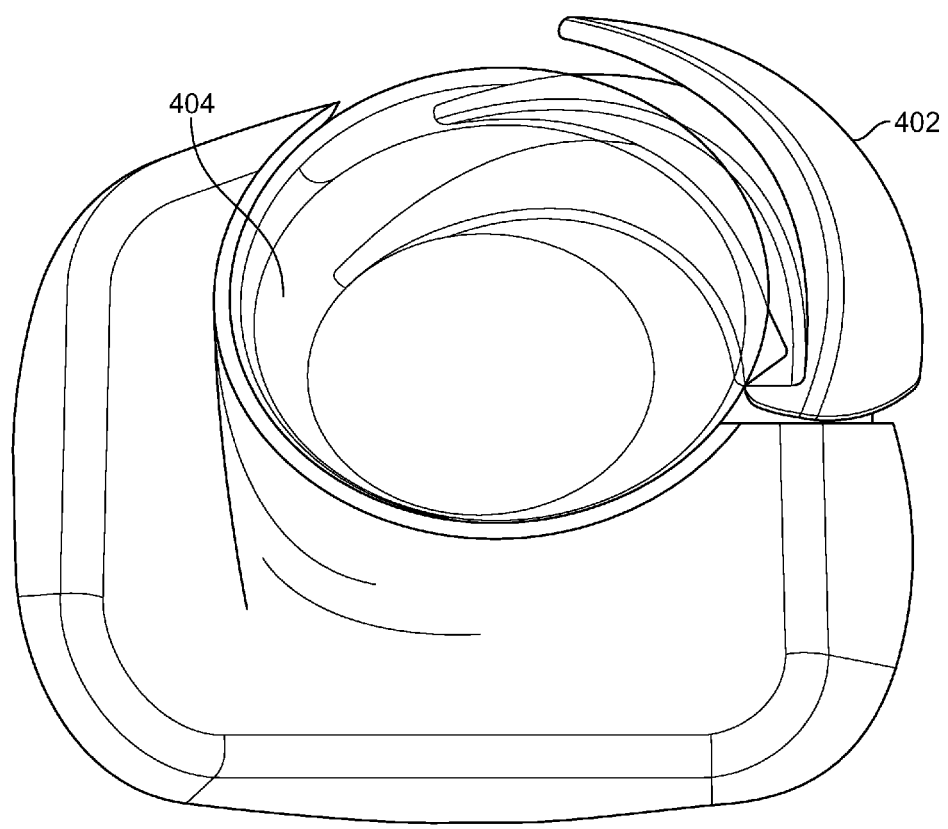
FIG. 4 is a schematic diagram depicting one implementation of a finger retention mechanism feature of the tracking device used to receive a user's finger.

FIG. 4 is a schematic diagram depicting one implementation of a finger retention mechanism feature of the tracking device 104 used to receive a user's finger. In some implementations, the tracking device 104 can be configured to receive a user's finger using mechanical means. For example, the tracking device 104 can include a flexible tab 402 that assists in holding the user's finger in place within the tracking device 104. In other implementations, the tracking device 104 can include an interior sleeve 404, which can assist in holding the tracking device 104 in place on a user's finger. In certain implementations the sleeve 404 may be offered in sizes ranging from small to large to suit a variety of users. The sleeve can be removed and a different size sleeve inserted to customize the fit for a particular user.

Figure 5:
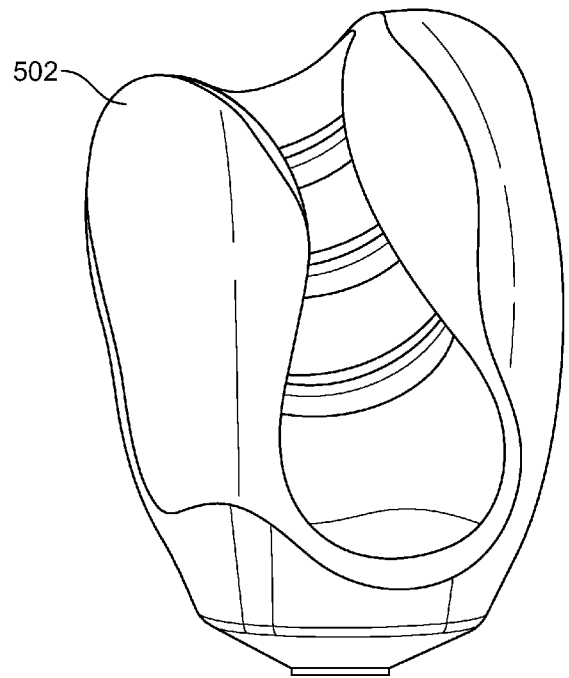
FIG. 5 is a schematic diagram depicting one implementation of a feature of the tracking device used to receive a user's finger.

FIG. 5 is a schematic diagram depicting one implementation of a feature of the tracking device 104 used to receive a user's finger. In certain implementations, the tracking device 104 can be configured to include a finger retaining hinge component 502. The retaining component may be produced, for example, from materials such as neoprene, saneprene, or foam. In certain implementations, the hinge component can be configured in several positions or locations. The user can insert their finger into the tracking device 104, which may include the retaining hinge component 502. Once inserted, the retaining hinge component 502 may hold the tracking device 104 to the user's finger by applying pressure. In certain implementations, the hinge component 502 can be produced from rubber, and may include springs, which press the hinge component 502 around the circumference of the finger.

In other implementations, the tracking device 104 may include a finger retaining interior ring component. In an exemplary implementation, the ring is made of a material similar to a gel. The ring can secure the tracking device 104 to the user's inserted finger by applying pressure around the circumference of the finger. If the ring is malleable (e.g., made of a gel) it can conform to the outer surface of the user's finger, which may result in a more comfortable fit.

Figure 6:
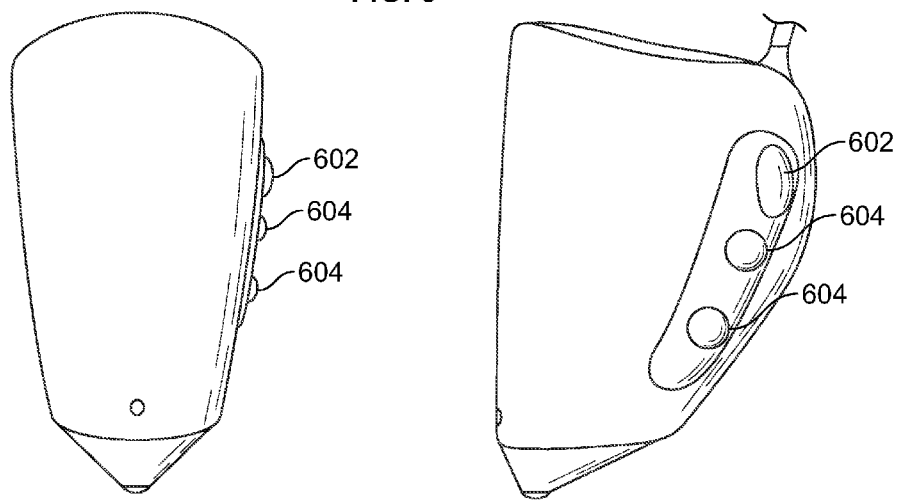
FIG. 6 is a schematic diagram depicting one implementation of device components used for selection.

FIG. 6 is a schematic diagram depicting one implementation of device components used for selection. FIG. 6 depicts a front and side view of the tracking device 104. In certain implementations, the tracking device 104 can include a scroll wheel 602 that may be used for navigation on a computer system. In other implementations, the tracking device 104 may include one or more selection buttons 604 to select information displayed by a computer system.

Figure 7:
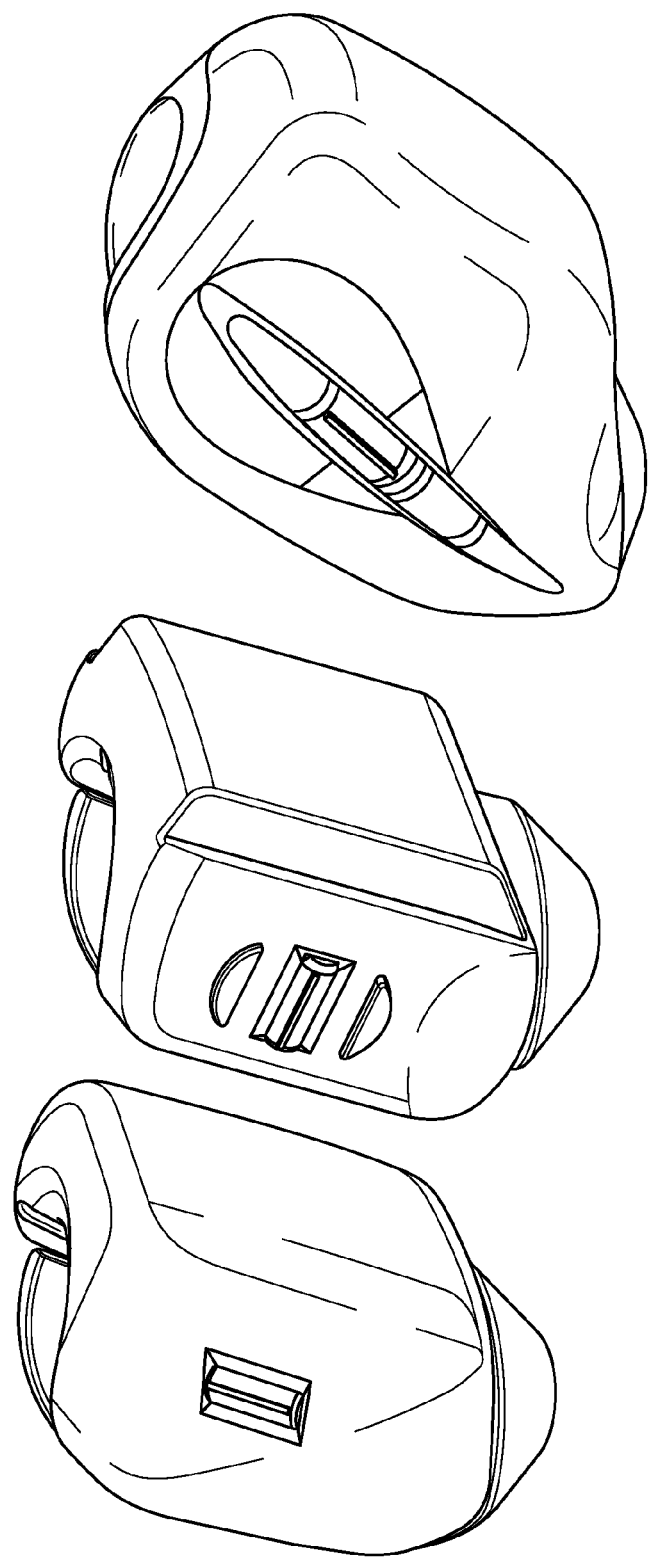
FIG. 7 is a schematic diagram depicting several implementations of scrolling features of the tracking device.

FIG. 7 is a schematic diagram depicting several implementations of scrolling features of the tracking device. As stated earlier, the tracking device 104 can be configured with various components or features for controlling movement of a cursor on a computer system. In certain implementations the tracking device 104 includes a scrolling mechanism and selection buttons oriented in a generally horizontal plane relative to a position in which the tracking device is upright. In other implementations, the tracking device 104 can include a scrolling mechanism and selection buttons oriented in a generally vertical plane. In other implementations, the tracking device 104 may include a scrolling mechanism oriented in a horizontal plane, and may include selection buttons located vertically relative to the scrolling mechanism.

Figure 8:
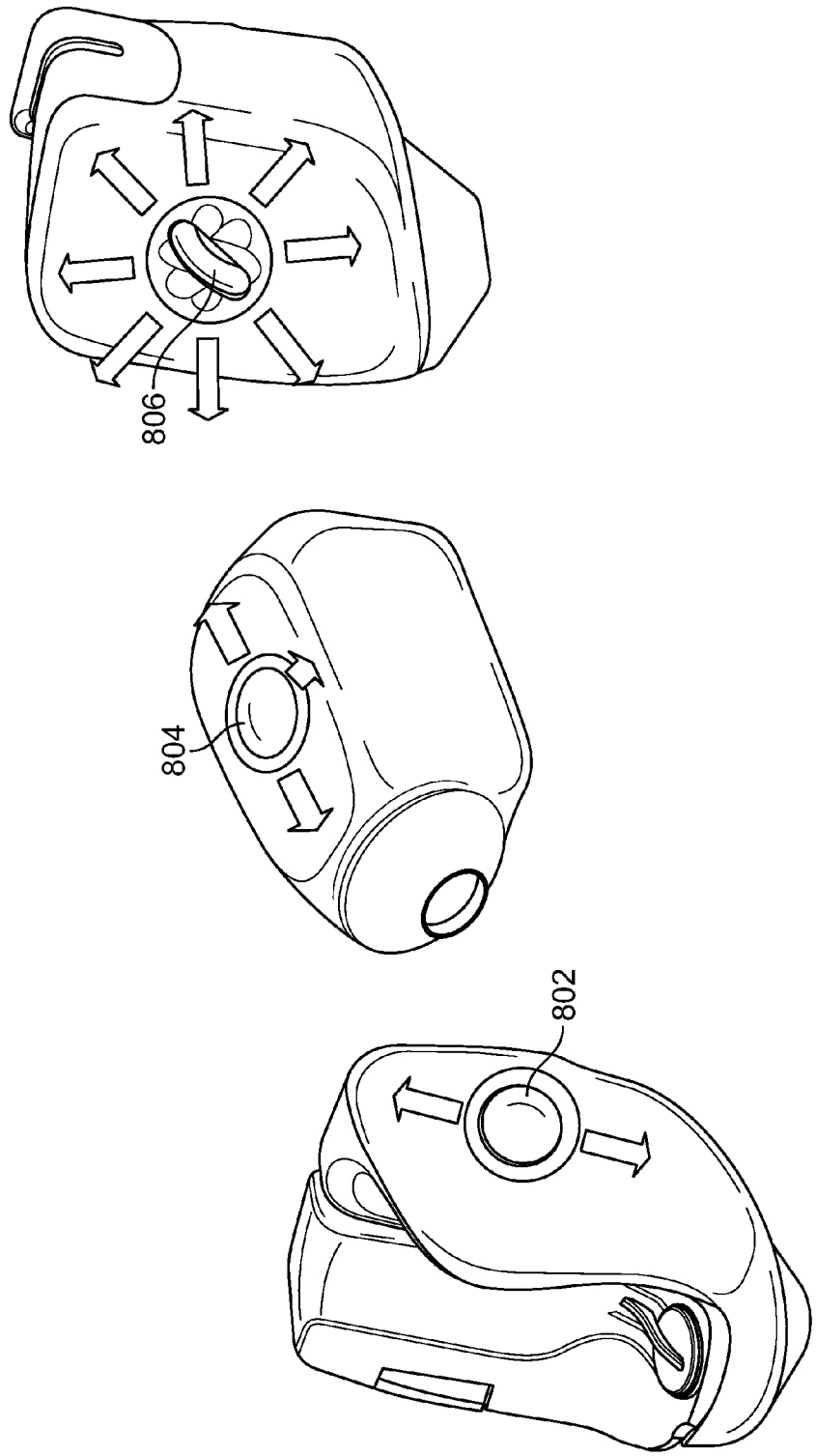
FIG. 8 is a schematic diagram depicting several additional implementations of a scrolling feature.

FIG. 8 is a schematic diagram depicting several additional implementations of a scrolling feature. In certain implementations, the tracking device 104 can include a track ball component 802 that can scroll in a limited number of directions. For example, the track ball component 802 may scroll in a single direction or in the reverse of that direction.

In other implementations, the tracking device 104 can include a trackball component 804 that has multiple functions. For example, the track ball component may scroll in multiple directions, and a user may press the trackball component 804 to make selections of objects displayed in a user interface.

In other implementations, the tracking device 104 can include a scrolling mechanism 806 that can scroll and be oriented in multiple directions. The position of the scrolling mechanism 806 can be maintained after adjustment by applying resistance supplied by a movement limiting mechanism, such as a set of splines surrounding the scrolling mechanism 804. For example, the user can adjust the scrolling mechanism 806 to a position that is a comfortable scrolling position for the user. The resistance of the splines prevents the scrolling mechanism 806 from slipping from that position.

Figure 9:
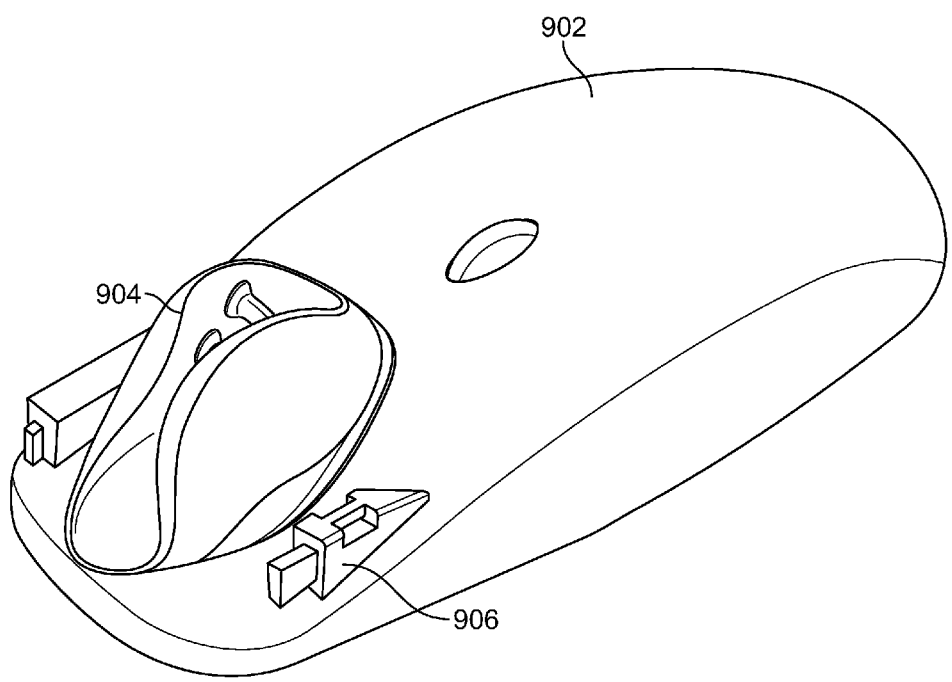
FIG. 9 is a schematic diagram depicting an implementation of a base where a tracking device is received at a frontal portion of the base.

FIG. 9 is a schematic diagram showing an implementation of a base 902 where a tracking device is received at a frontal portion of the base 902. In an exemplary implementation, the tracking device 904 can be configured to protrude partially outside the front of the base 902 to allow the user's finger quick access for removal from the base 902. In another implementation, the base 902 may include other components that require the components be located in the middle, or back locations of the base 902. For example, the base 902 may include tracking mechanism components that occupy the space in the middle and back locations of the base 902.

In some implementations, if the user wants to remove the tracking device 904 and place it in the base 902, the user can place the tracking device 904 into a cavity of the base 902, and the user can move his finger backwards to secure the tracking device 904 to the base 902. In some implementations, the based has securing components, such as protrusions, that are used to snap the tracking device into place. After the user secures the tracking device 904 to the base 902, the user can remove his finger from the tracking device 904. If the user wants to remove the tracking device 904 from the base 902, the user can place his finger inside the tracking device 904 and move their finger forward to release the tracking device from the securing components.

Figure 10:
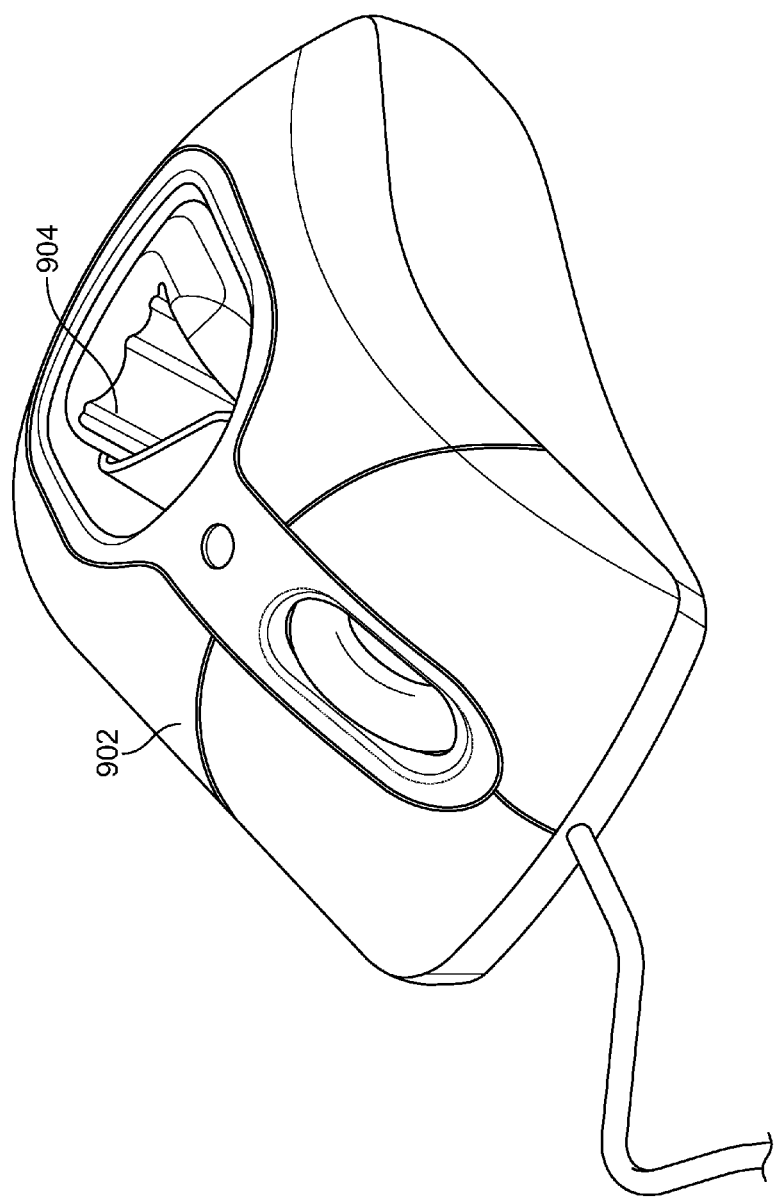
FIG. 10 is a schematic diagram depicting a second implementation of the base where a tracking device is received at a middle portion of the base.

FIG. 10 is a schematic diagram depicting a second implementation of the base where a tracking device is received at a middle portion of the base. The base 902 can be implemented so that it receives the tracking device 904 at a middle section of the base 902, which may facilitate the placement of other components at the front or back locations of the base 902. For example, buttons similar to those included with a traditional computer mouse may be configured at the front of the base 902. In another example, a USB Key 906 can be stored in the base 902. The USB Key 906 may, for example, be used by the computer system to communicate wirelessly with the tracking device 904, when the tracking device 904 is inserted into the base 902. The base 902 may communicate with the computer system using other methods (e.g., wired). In this situation, the storage of the USB Key 906 in the front or rear portion of the base may prevent the base from receiving the tracking device 904 at either of these locations, so the base can include a cavity in the middle portion to receive the tracking device.

Figure 11:
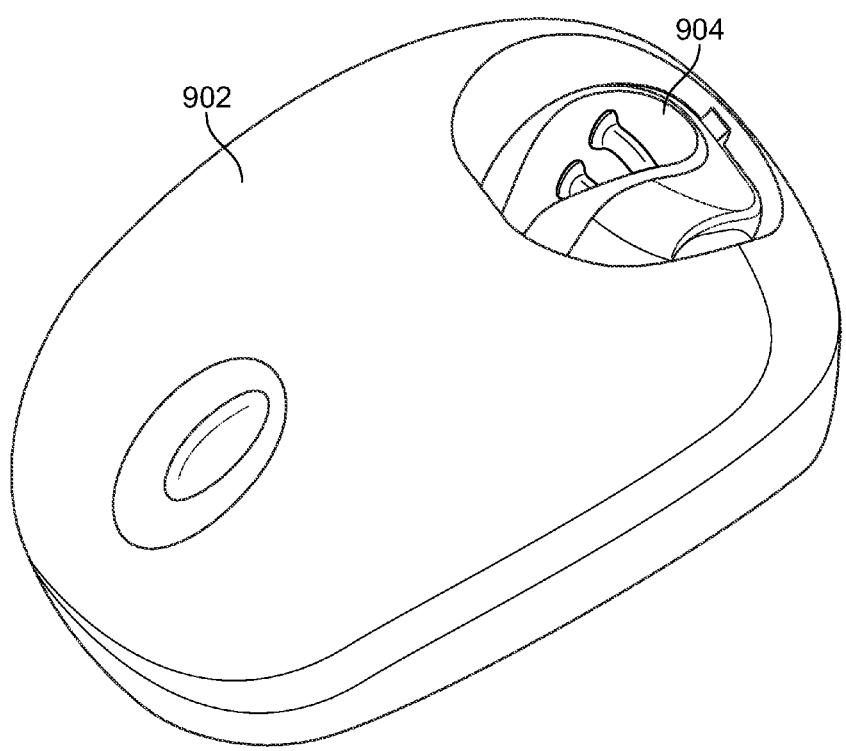
FIG. 11 is a schematic diagram depicting a third implementation of the base where a tracking device is received at a back portion of the base.

FIG. 11 is a schematic diagram depicting a third implementation of the base 902 where a tracking device 904 is received at a back portion of the base 902. In this implementation, a cavity may be formed at the back of the base 902 so that the tracking device can fit entirely into the base 902, for example, when the base has a smaller form factor near the front of the base than near the rear of the base.

As depicted by FIG. 9, FIG. 10, and FIG. 11, the base 902 can receive the tracking device 904 at many locations. In another example implementation of the base 902 (not shown in the figures) the tracking device and be received at a side location. For example, the tracking device can attach the other base's side using a clipping or snap mechanism. In certain implementations, the side location may provide increased internal space within the base 902 for additional components. In other implementations, the side location may permit the base 902 to have a smaller form factor.

Figure 12:
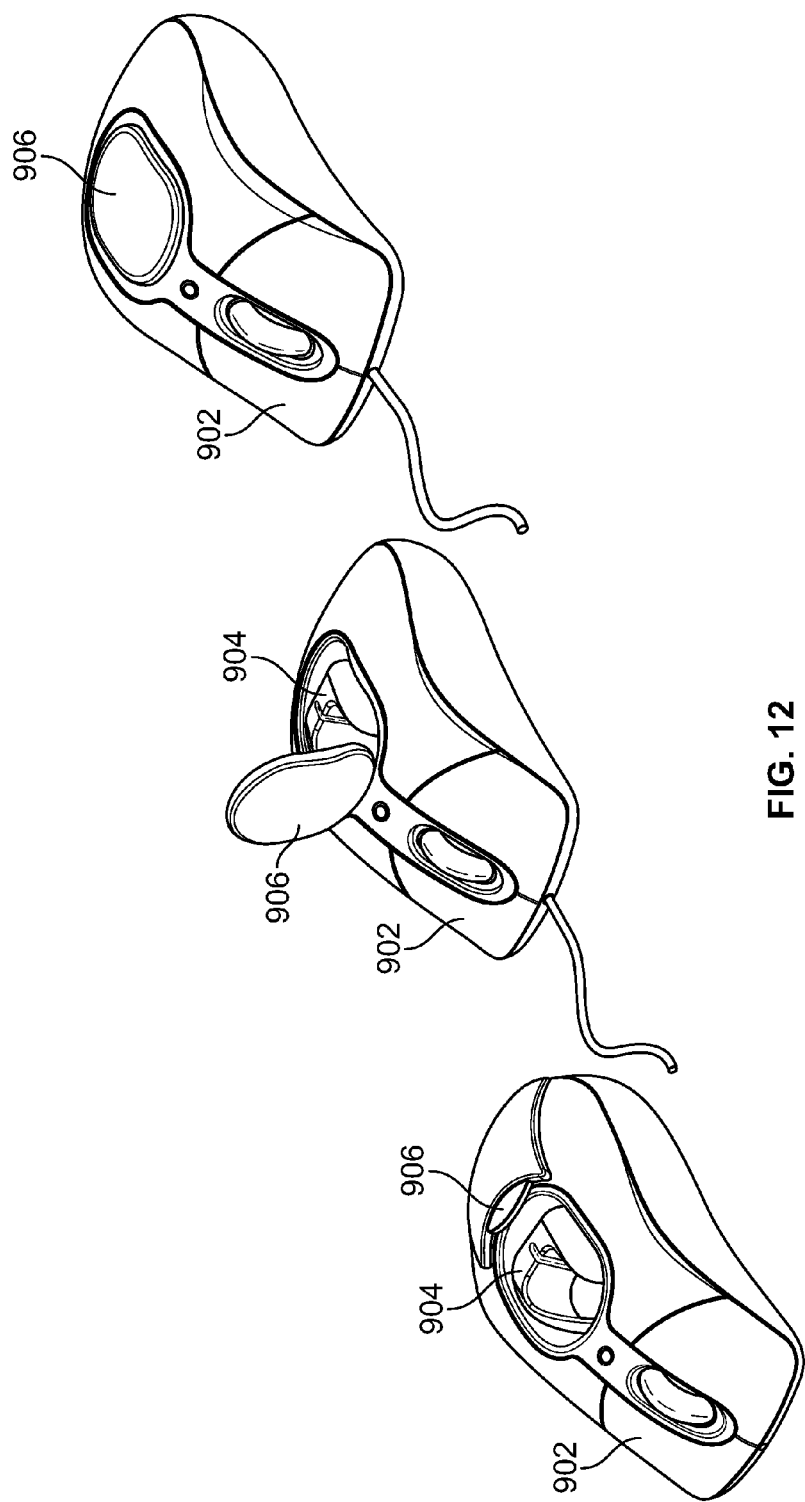
FIG. 12 is a schematic diagram depicting several implementations of a lid feature of a base.

FIG. 12 is a schematic diagram depicting several implementations of a lid covering feature of the base 902 used to receive a tracking device 904. The lid 906 may be opened to insert the tracking device 904 within the base 902. In certain implementations, the lid 906 may include a spring mechanism to open the lid that can be activated when pressed by a user. Additionally, the lid 906 may be closed to protect the tracking device 904 from debris, or to provide a more comfortable grip for the user's hand. In certain implementations, the lid 906 may be held closed by an included latching mechanism. Additionally the lid 906 may slide within a portion of the base 902 to allow access to a cavity of the base in which the tracking device 904 is inserted. In other implementations, the lid 906 may be removed and stored, for example, in the bottom of the base 902.

Figure 13:
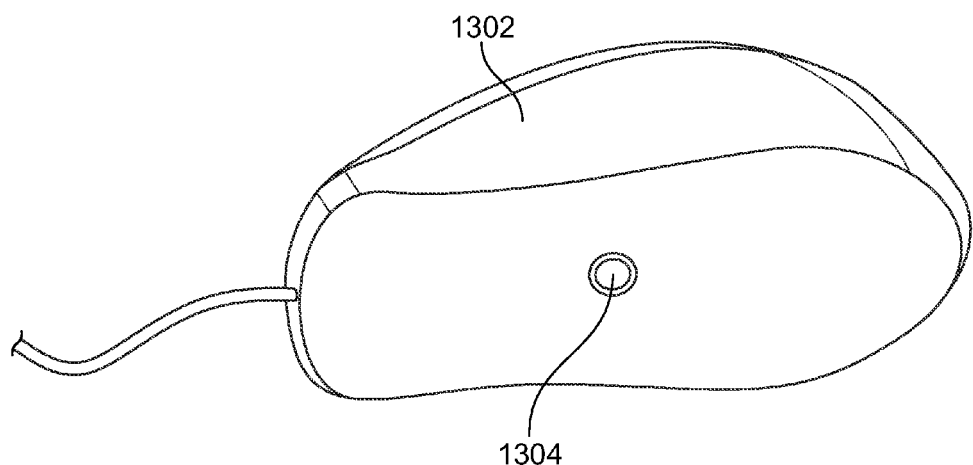
FIG. 13 is a schematic diagram depicting one implementation of a base, which includes an opening that allows a tracking device access to an adjacent surface.

FIG. 13 is a schematic diagram depicting one implementation of a base 1302, which includes an opening 1304 that allows a tracking device 904 access to an adjacent surface. In certain implementations, the base 1302 can use the tracking mechanism of the tracking device 904 by allowing the optics, track ball, or laser access to the adjacent surface through the opening 1304 in the bottom of the base 1302.

In certain implementations, the base 1302 can use the tracking mechanism of the tracking device 904. For example, the base 1302 can disable its own tracking mechanism, and use the tracking mechanism of the tracking device 904 instead. The base 1302 may include circuitry that connects the tracking device's tracking mechanism to the base 1302. For example, the base may include prongs that contact plates on the tracking device 904 when the tracking device 904 is inserted in the base 1302. The tracking device 904 can transmit movement information through this connection to the base 1302. In some implementations, this connection to the base can also be used to charge the tracking device using power delivered or originating from the base.

Figure 14:
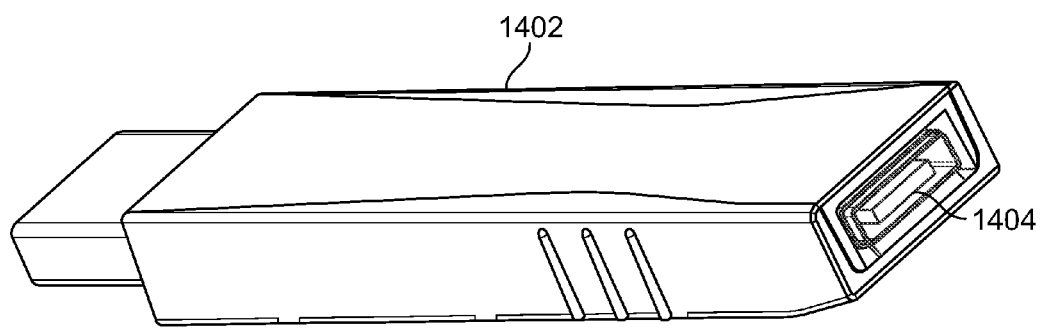
FIG. 14 is a schematic diagram depicting a connection component of a system used to relay information from a tracking device to a computer system.

FIG. 14 is a schematic diagram depicting a connection component 1402 of a system used to relay information from a tracking device 1302 to a computer system 102. In some implementations, the connection component 1402 is a USB key. For example, the base 1502 can include a cord that connects to the USB Key 1402. An interface between the USB key 1402 and the base 1502 can be proprietary so that a user cannot easily plug the base 1502 into unintended receptacles, such as PS-2 ports on a computing device. In certain implementations, the cord can recoil inside the base 1502 or be wrapped up and stored in a cavity located underneath the base 1502.

In certain implementations, the cord can be detached from the base 1502. Unplugging the cord from the base 1502 can, for example, permit the base 1502 to be more conveniently stored. In other implementations, the base 1502 may not have a cord, but communicates wirelessly with the computer system 102.

In some implementations, the tracking device 1302 may have batteries that are charged when the tracking device 1304 is inserted in the base 1502. For example, the base can receive power through a corded connection to the computer system 102. The power can be transferred from the base to the tracking device for charging the batteries. In other implementations, the base is not corded, but instead receives power from disposable or rechargeable batteries.

In some other implementations, the connection component 1402 can send and receive information to and from the computer system 102. For example, the connection component 1402 can be a wireless transceiver that transmits and receives information from the base device (or the tracking device) and sends the information to the computer system 102. In some implementations, the tracking device can transmit information wirelessly, while the base device transmits information to the computer system 102 via a wired connection.

Figure 15:
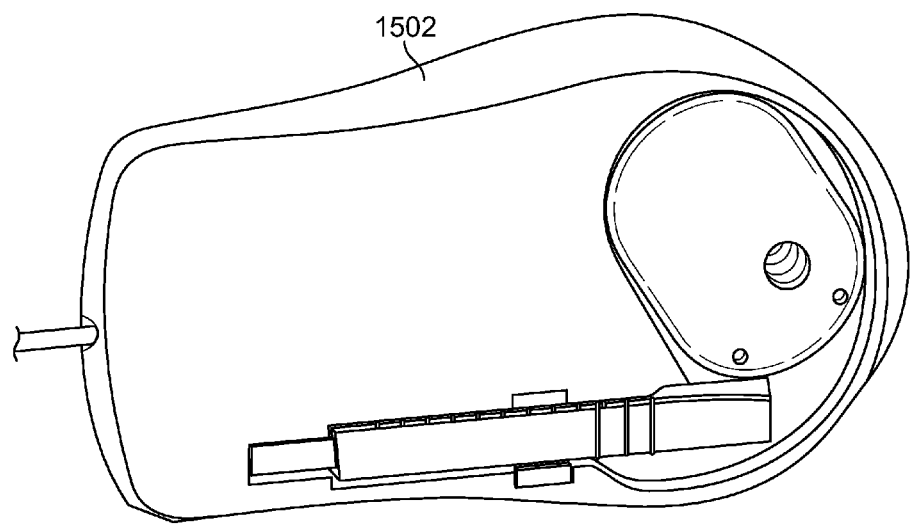
FIG. 15 is a schematic of one implementation of a base storage feature.

FIG. 15 is a schematic diagram of one implementation of a base storage feature. In certain implementations, the USB key 1402 can be stored with, or connected to the base 1502. For example, the USB key 1402 can be stored in the bottom of the base 1502, where the base 1502 may include a holding mechanism such as tabs or clamps. In addition to the functionality described above, in certain implementations, the USB key can store information including, for example, software drivers for the tracking device 104 or other data files that can be accessed by the computer system 102.

Figure 16:
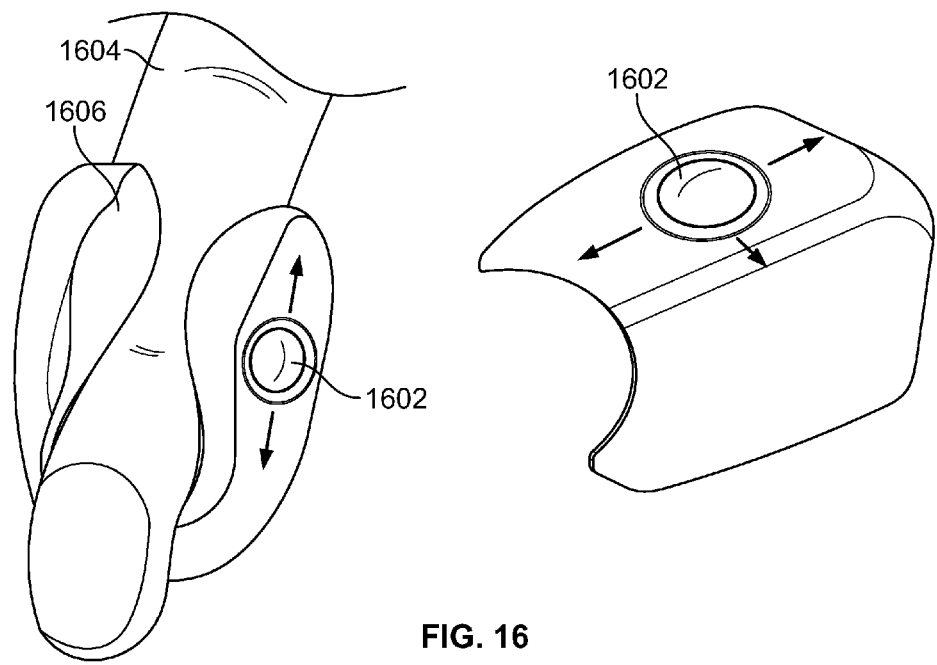
FIG. 16. is a schematic diagram depicting alternative implementations of the tracking device.

FIG. 16. is a schematic diagram depicting alternative implementations of the tracking device 104. FIG. 16 shows an implementation where the tracking device is configured without a tracking mechanism at the tip of the tracking device 104. This may permit a user's finger 1604 to extend through the tracking device 104 held on the user's finger 1604, for example, using a flexible clamping mechanism 1606. Allowing the user's finger 1604 to extend through the tracking device 104 may allow normal use of the finger for tasks, such as typing on a computer keyboard.

The tracking device of FIG. 16 also includes a trackball component 1602, which can have multiple functions. For example, the track ball component 1602 may navigate a cursor on a user interface or perform scrolling functions. Additionally, a user may press the trackball component 1602 (e.g., using an adjacent finger or thumb) to make selections of objects displayed in a user interface.

Although a few implementations have been described in detail above, other modifications are possible. For example, in certain implementations, the tracking device 104 can include a LCD (liquid crystal display) component for inputting information into, or outputting information from the computer system or the tracking device. For example, the LCD screen may display "status information" for the tracking device, such as charge status. In some implementations, the LCD screen may be located on the tracking device 104 in locations as the side facing the user's thumb or other locations at which a user could view the display.

In other implementations, the inner portion of the tracking device that receives a user's finger can include surface relief structures, such as venting ribbing, channels, dimpling, etc. This may provide sensor feedback to a user to limit fatigue, control sweating, and release heat. Additionally, the inner portion may include a conical shape that narrows towards the tip of the tracking device. This may ensure finger retention by the use of pressure points and finger friction against the narrowing inner portion of the tracking device.

In yet other implementations, the tracking mechanisms (e.g., optical sensors) for the tracking device can be located so that the tilt of the mechanism is ergonomic. For example, when a user inserts her finger in the tracking device, optical sensors are placed on the device so that in a natural position of the finger (e.g., resting position), the sensors are neither tilted to the right or the left, but are substantially parallel to the adjacent surface.

In other implementations, the tracking mechanism for the device is located on a swivel so that it can move into a position substantially parallel to the adjacent surface even if the user's positioning of the tracking device would not place the tracking mechanism in a substantially parallel position without the swivel.

In some implementations, the base can charge the tracking device using a household current instead of through a connection to a computing device. For example, a cord for the base can be inserted into a household electrical outlet, which provides power to the tracking device when inserted into the base. In other implementations, the base can be configured to include a battery (e.g., a rechargeable battery) for charging the tracking device. For example, the battery can receive a charge by plugging the base into a USB or standard electrical outlet. A battery of the tracking device can then be charged by the base's battery when the tracking device is inserted into the base. In other implementations, the tracking device may be inserted or coupled to a charger that is separate from the base. This charger may receive it power from a variety of sources including a household electrical outlet, batteries, or a computer's power supply unit (e.g., through a USB connection).

In some implementations, the base can be secured to a side of a laptop computer or keyboard using a clamping mechanism. One end of the clamping mechanism can be configured to attach to the keyboard or laptop computer and the other end of the clamping mechanism can secure the base. For example, the clamping mechanism can clamp to the side of a keyboard using a vice-like mechanism.

In some implementations, the clamping mechanism can connect to the base using a male-to-female connection. For example, prongs may extend out from the clamping mechanism and mate with ports in the base. In some implementations, the prongs can be flexible plastic, or some type of hooks.

In some implementations, the base can be large enough to house additional components besides the tracking device, such as the lid and the USB Key. For example, the lid and the USB Key can be stored in the bottom of the base.

In some implementations, the base can include light emitting diodes (LEDs) to indicate the charging status of the tracking device. If the option of a rechargeable battery in the base is included, an LED can be included, for example, to indicate its charge status as well.

In other implementations, the USB Key can be inserted into a computer USB slot and communicate wirelessly to the tracking device while connected via cord to the base. Also, the tracking device and the base can be configured to communicate wirelessly with the computer without using the cord.

In some implementations, a holder component can be used to hold the tracking device. The holder component can be used independent from the base. The holder can be attached to a keyboard, computer display, or computing device component using a clamp, clip, or various other securing mechanisms. In some implementations, the holder can include charging tabs and a cord that connects to a USB Port or the USB Key port for charging. In another implementation, the base's cord may connect to a household outlet for receiving power.

In yet other implementations, a second tracking device can be used in conjunction with a first tracking device to control one or more user interface elements. For example, a tracking device can be worn on one finger of each hand of a user. In this example, the user can use the tracking devices to manipulate interface objects, such as three-dimensional objects, by spinning rotating both fingers that are secured to the tracking devices. In other examples, the tracking devices can be used to manipulate objects in a video games, for example moving one finger with a first tracking device causes a first character action, moving the second finger with another tracking device causes a second character action, and moving both the first and second fingers simultaneously causes a third character action.

In yet other examples, a user having a tracking device on a finger of each hand can use selection buttons on each of the tracking devices to manipulate displayed objects, such as video game characters.

In certain implementations, a cord for the base device connects to the USB key using a non-standard USB connection. This may prevent a user from inadvertently plugging the based device directly into a USB port on the computer.

Accordingly, other implementations are within the scope of the following claims.

What is claimed is:

1. A wireless finger-worn motion tracking device comprising:
   a housing configured to be worn on a finger of a user, the housing having a passage therethrough,
   the passage defining a passage axis generally coaxial with a longitudinal axis of the user's finger when the user's finger is extending through the passage of the housing in a finger-worn position,
   the housing including an internal finger contact surface that is facing generally radially inward toward the passage axis, the internal finger contact surface making contact with the user's finger when in the finger-worn position,
   the housing passage and internal finger contact surface configured such that an end portion of the user's finger can be extended through the passage entirely to the finger-worn position such that the end portion of the user's finger is out of contact with the internal finger contact surface in the finger-worn position,
   the housing further including an external outside surface that is facing generally radially outward from the passage axis, the external outside surface being not in contact with the user's finger when in the finger-worn position,
   the housing further including an inner space between the internal finger contact surface and the external outside surface,
   wherein the inner space is configured to contain all electronics for operating the wireless finger-worn motion tracking device;
   wireless communication components disposed within the inner space, the wireless communication components configured and operable to wirelessly communicate with a separate computing system;
   a motion tracking mechanism disposed within the inner space and configured and operable to generate, in response to movements of the housing, tracked movement information for use in controlling the separate computing system, the motion tracking mechanism comprising an accelerometer;
   a selection mechanism coupled to the housing and configured and operable to generate, in response to an activation of the selection mechanism, selection information for use in controlling the separate computing system; and
   a display device located on the housing, wherein the display device is configured and operable to output information.

2. The device of claim 1, wherein the separate computing system is configured and operable to control a display device, and wherein the tracked movement information is used by the separate computing system to generate data for controlling the display device.

3. The device of claim 1, wherein the selection mechanism is accessible on the external outside surface of the housing and is configured and operable to be activated by a second finger of the user when the user's finger is wearing the housing.

4. The device of claim 1, wherein the accelerometer is a first accelerometer, wherein the selection mechanism comprises a second accelerometer, and wherein the selection mechanism is configured and operable to generate the selection information in response to movement sensed by the second accelerometer.

5. The device of claim 1, in further combination with a base with which the motion tracking device can electrically couple to receive electrical power for charging the motion tracking device.

6. The device of claim 1, wherein the housing of the motion tracking device encloses the user's finger when in the finger-worn position.

7. The device of claim 1, further comprising one or more display components coupled to the housing, wherein the one or more display components are configured and operable to output information that is viewable by the user.

8. The device of claim 7, wherein the information represents a status of the motion tracking device or the separate computing system.

9. The device of claim 1, wherein the motion tracking device is configured and operable to receive communication from the separate computing system.

10. The device of claim 1, wherein the motion tracking device is configured and operable to perform, in response to an input applied to the motion tracking device, a scrolling function.

* * * * *

UNITED STATES PATENT AND TRADEMARK OFFICE
CERTIFICATE OF CORRECTION

PATENT NO. : 9,092,075 B2  
APPLICATION NO. : 14/592475  
DATED : July 28, 2015  
INVENTOR(S) : Bailen Page 1 of 1

It is certified that error appears in the above-identified patent and that said Letters Patent is hereby corrected as shown below:

In the specification

Column 1, line 8, delete "May 2, 2007" and insert -- May 25, 2007 --, therefor.

Signed and Sealed this
Twelfth Day of January, 2016

Michelle K. Lee
*Director of the United States Patent and Trademark Office*